June 19, 1951     J. D. REPKO ET AL     2,557,689

BALL-SLIDING BEARING

Filed April 17, 1946

INVENTORS
JAN DIRK REPKO
ALEXANDRE HOROWITZ

BY
ATTORNEY

Patented June 19, 1951

2,557,689

UNITED STATES PATENT OFFICE 2,557,689

BALL-SLIDING BEARING

Jan Dirk Repko and Alexandre Horowitz, Eindhoven, Netherlands, assignors, by mesne assignments, to Hartford National Bank and Trust Company, Hartford, Conn., as trustee Application April 17, 1946, Serial No. 662,679
In the Netherlands July 9, 1943

Section 1, Public Law 690, August 8, 1946
Patent expires July 9, 1963

3 Claims. (Cl. 308—6)

This invention relates to a ball sliding bearing, particularly for use in precision instruments, in which a sliding shaft is adapted to move relatively to a guide in the direction of the axis of the shaft, and has for its object to provide a construction for such a bearing which with regard to play and friction embodies high requirements.

The slide ball bearing according to the invention is characterized by the feature that for the purpose of journalling use is made of three balls, at least two of the angles which the perpendiculars from the centers of the balls to the centre line of the slide shaft include exceeding 90°. The sliding shaft is thus prevented from moving in directions normal to the centre line of the shaft if the bearing is adjusted correctly.

In a favourable construction according to the invention the sliding shaft is provided with at least one flattened guide-way. As will be explained hereinafter, this permits of a travel free from play being secured in a simple manner.

In a preferred embodiment of the construction according to the invention each ball has altogether three points of contact with the sliding shaft and the guide. This construction permits of minimizing the friction.

In order that the invention may be clearly understood and readily carried into effect it will now be described more fully with reference to the accompanying drawing, in which Figure 1 is a cross-section of a shaft taken in a plane normal to the axis thereof, showing a form of construction of sliding ball bearings according to the invention. The ball bearings are shown in elevation.

Figure 1:
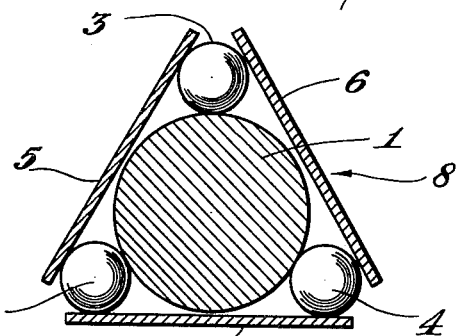

The sliding shaft 1 of the sliding bearing shown in Figure 1 is journalled with the use of three balls 2, 3 and 4 whose centres are located in a plane normal to the centre line of the sliding shaft. The guide is constituted by three flat plates 5, 6 and 7 which are arranged parallel to the centre line of the sliding shaft and include angles of 60°. These flat plates may be connected so that the guide can be folded for example from one piece of plate.

Each ball is in contact with the guide at two points and with the shaft at one point. Owing to these three points of contact, the ball is prevented from moving in a direction normal to the centre line of the sliding shaft. To be noted is the short length of travel of the ball which is secured by this construction. In the present case it is but a third part of the length of travel of the sliding shaft.

In order that it may be possible to adjust the bearing correctly it is preferable that one of the plates, for example the plate 6, should be adjustable in the direction 8. If the friction is not considered of too much importance in a device in which the ball bearing construction of the present invention is to be utilized, preferably but two contact surfaces associated with the same ball are adjusted resiliently so that the position of the shaft is determined in a positive manner.

Figure 2:
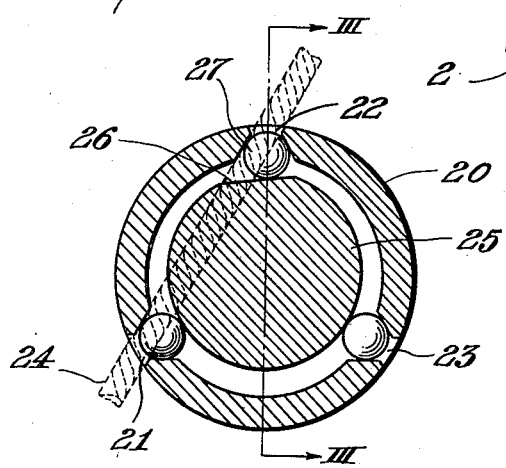
Figure 2 is a cross-section of a shaft, taken similarly to that of Figure 1, of another form of construction according to another embodiment of the invention.
Figure 3:
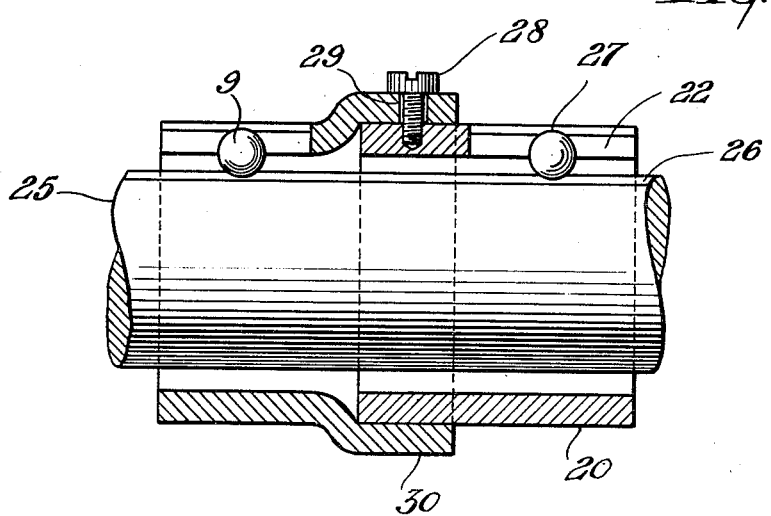
Figure 3 is a cross-sectional view of the sliding bearing shown in Figure 2 along line III—III thereof and showing the means for preventing play.

Figures 2 and 3 show a further favourable embodiment of the construction according to the invention. As best seen in Figure 2, the tubular guide 20 comprises slits 21, 22 and 23 which extend parallel to the centre line of the tube. The walls of these slits act as races for the balls. The two guide-way surfaces associated with one ball include an angle of 60° and the two guideway surfaces arranged on adjacent sides of two balls are located in one plane. Such races can be produced in a simple manner, for example by milling, the axis of a wide edge mill crossing adjacent the centre line of the tube at right angles thereto and the milling cutter traversing three times a strip of the kind designated 24 in the figure. The use of the tubular form permits of choosing the ratio between ball diameter and sliding shaft diameter as small as desired so that a compact construction becomes possible.

The sliding shaft 25 is provided here with a flattened edge 26 which cooperates with the ball 27 of the group of balls shown in Figure 2, and also with a ball 9 of a second group of balls similar in all respects to the group shown in said Figure 2 for the purpose which will become apparent hereinafter. The dimensions of the shaft and the balls are chosen so as to leave a slight play after mounting. The balls may be removed entirely by rotating the sliding shaft 25 about its centre line relatively to the guide 20. Such an adjusting possibility is obtainable since on the path of contact of at least one of the balls 27 (and 9) the peripheral surface of the sliding shaft diverges from the cylindrical shape as by the flattened edge 26 described hereinbefore. For example, it will be evident from Figure 2 that if shaft 25 be rotated clockwise, flattened edge 26, on approaching the horizontal, as viewed therein, will provide more room for ball 27 so that it may drop from its race 22 and thus be removed. Once ball 27 is removed, the balls in races 21 and 23 may be removed simply by shifting shaft 25 laterally of its own axis. It will be seen that precautions must be taken to prevent any rotation of the sliding shaft 25 relatively to the guide 20 when the parts are in the operative position and it is desired that they remain so. This, however, can be achieved if, as will frequently be the case as shown in Figure 3, two sliding bearings 20 and 30 are used for the one sliding shaft 25. In this case it suffices to rotate the two guides 20 and 30 about the centre line to such an extent relatively to each other that the play is removed. As shown in Figure 3, this may be achieved by coupling the guide 30 on the guide 20 and providing means for fixing said guides in desired adjustable rotational relationship by means of a conventional screw clamp 28 mounted on guide 20 and riding in a lateral slit 29 on guide 30. The freedom from play being secured without springs, the friction in these constructions is particularly low.

The invention enables the construction of a ball slide bearing which is practically free from friction and entirely free from play and which is suitable for use in precision instruments, particularly in sliding electrode condensers.

What we claim is:

1. A ball sliding bearing comprising a cylindrical shaft, a guide in which said shaft is mounted for movement in the direction of the main axis thereof, with no portion of said shaft directly touching any portion of said guide, and journalling means for said shaft in said guide comprising a set of three balls dispersed around the periphery of said shaft so that at least two of the angles formed by the lines which may be drawn from the centers of each of said balls to the center line of the sliding shaft exceed 90°, each of said balls contacting said guide at only two points and said shaft at only one point, said cylindrical shaft having a flattened portion on the periphery thereof with which one of said balls makes said point contact.

2. A ball sliding bearing comprising a cylindrical shaft, a tubular guide in which said shaft is mounted for movement in the direction of the main axis thereof, with no portion of said shaft directly touching any portion of said guide, said guide having three longitudinally disposed slots dispersed around the circumference thereof, each of said slots having a pair of opposing surfaces at an angle to each other, one surface of one slot and an adjacent surface of another slot lying in the same plane with each other, and journalling means for said shaft in said guide comprising a set of three balls dispersed around the periphery of said shaft and each positioned in one of said slots, respectively, so that at least two of the angles formed by the lines which may be drawn from the centers of each of said balls to the center line of the sliding shaft exceed 90°, each of said balls contacting said guide at only two points and said shaft at only one point.

3. A ball sliding bearing comprising a cylindrical shaft, a pair of guides in which said shaft is mounted for movement in the direction of the main axis thereof, with no portion of said shaft directly touching any portion of said guides, and journalling means for said shaft in said guides comprising a separate set of three balls on each guide, said guides being displaced from each other in the direction of the main axis of the shaft, each set dispersed around the periphery of said shaft so that at least two of the angles formed by the lines which may be drawn from the centers of each of said balls to the center line of the sliding shaft exceed 90°, each of said balls contacting said guide at only two points and said shaft at only one point, said cylindrical shaft having a flattened portion on the periphery thereof extending in the direction of the length of said shaft, one ball of each of said sets making point contact with said flattened portion, and means for rotationally adjusting one of said guides and the corresponding set of balls therewith in relation to said other guide and corresponding set of balls.

JAN DIRK REPKO.
ALEXANDRE HOROWITZ.

REFERENCES CITED

The following references are of record in the file of this patent:

FOREIGN PATENTS

| Number | Country | Date |
| --- | --- | --- |
| 195,821 | Great Britain | 1936 |
| 806,993 | France | 1936 |